United States Patent Office 2,986,592
Patented May 30, 1961

2,986,592

ALKALINE PRIMARY CELLS HAVING ANODES OF NIOBIUM, VANADIUM, OR MOLYBDENUM

John McCallum, Worthington, and Walter E. Ditmars, Jr., Columbus, Ohio, assignors, by mesne assignments, to Remington Arms Company, Inc., Bridgeport, Conn., a corporation of Delaware No Drawing. Filed July 17, 1956, Ser. No. 598,239

6 Claims. (Cl. 136—100)

This invention relates to current-generating cells, and more in particular to current-producing cells having a metallic anode in an alkaline electrolyte. This application is a continuation-in-part of United States patent application Serial No. 405,494, filed January 21, 1954, now abandoned.

Significant electric potentials and currents have been observed in current-generating cells having an alkaline electrolyte in contact with anodes of niobium, vanadium, and molybdenum. It has been found that batteries constructed from these materials have long shelf lives, and deliver useable currents for long periods of time.

The electrolyte may be any alkaline solution, such as sodium hydroxide, potassium hydroxide, or ammonium hydroxide. The electrolyte should preferably have a pH of at least about 12.8, and the concentration may vary from about 1 percent to saturation. Activation of the cell may be slow, but it is possible to reduce the activation time by dipping the electrode in a fluoride or other oxide-dissolving solution prior to immersion in the electrolyte in order to remove oxide coatings from the surface of the metal. Activation time is substantially independent of the concentration of the alkaline solution, thus enabling the use of cells having low concentrations. Cells with relatively low concentrations have long shelf lives, and are well adapted to uses which intermittently require moderate currents. Polarization diminishes with an increase in concentration of the alkali in the electrolyte.

Complexing agents may be added to the electrolyte in the niobium and vanadium cells, but the effect is not, in general, very great. It appears that the hydroxyl group present in the alkaline solution acts on these materials in a similar manner to the complexing agent. The complexing agent may either inhibit the formation of insoluble compounds on the metal, or it may form soluble complexes. Thus, the complexing agent serves to maintain the surface of the electrode in a chemically active condition.

Suitable complexing agents include aromatic organic compounds with adjacent hydroxyl groups such as catechol (1,2-benzenedial), catechol derivatives such as tertiary butyl catechol and fluorinated, chlorinated, or other ring-substituted catechols, and 1,2-dihydroxy naphthalene. Aliphatic compounds with adjacent hydroxyl groups such as tartaric acid, mannitol, gluconic acid, glycol and various sugars, and the salts of these acids, such as potassium tartrate and sodium tartrate, have also been found to be satisfactory complexing agents.

The positive electrode may be of any suitable construction or material, such as nickel oxide, copper oxide, or air-depolarizing porous carbon. Typical examples of primary cells embodying the present invention are as follows:

EXAMPLE I

*Niobium anode cell*

A body of niobium, serving as the negative electrode (anode), and a conventional air-depolarizing electrode of porous carbon, serving as the positive electrode (cathode), are immersed in a sodium hydroxide solution having a concentration of 25 weight percent. The cell has an open circuit potential of 1.15 volts, and at a current drainage of 6.7 milliamperes per square inch of anode the potential is 1.03 volts.

EXAMPLE II

*Vanadium anode cell*

A body of vanadium, serving as the negative electrode (anode), and a conventional air-depolarizing electrode of porous carbon, serving as the positive electrode (cathode), are immersed in a sodium hydroxide solution having a concentration of 25 weight percent. The cell has an open circuit potential of 0.83 volt, and at a current drainage of 33 milliamperes per square inch of anode the potential is 0.45 volt.

EXAMPLE III

*Molybdenum anode cell*

A body of molybdenum, serving as the negative electrode (anode), and a nickel oxide electrode, serving as the positive electrode (cathode), are immersed in a potassium hydroxide solution having a concentration of 14.0 M with 0.25 M potassium tartrate. The cell has an open circuit potential of 1.19 volts, and at a current drainage of 5.0 milliamperes per square inch of anode the potential is 0.97 volt.

What is claimed is:

1. In a current-generating primary cell comprising a cathode, an anode, and an alkaline electrolyte, the improvement wherein said anode consists essentially of a material selected from the group consisting of niobium, vanadium, and molybdenum.

2. In a current-generating primary cell comprising a cathode, an anode, and an alkaline electrolyte, the improvement wherein said anode consists essentially of a material selected from the group consisting of niobium, vanadium, and molybdenum, and said electrolyte has a pH of at least about 12.8.

3. In a current-generating primary cell comprising a cathode, an anode, and an alkaline electrolyte, the improvement wherein said anode consists essentially of niobium.

4. In a current-generating primary cell comprising a cathode, an anode, and an alkaline electrolyte, the improvement wherein said anode consists essentially of vanadium.

5. In a current-generating primary cell comprising a cathode, an anode, and an alkaline electrolyte, the improvement wherein said anode consists essentially of molybdenum.

6. A primary alkaline cell comprising an anode substantially completely consisting of molybdenum, an alkali metal hydroxide electrolyte, and a depolarizer cathode including an electrolytically reducible oxygen yielding compound.

References Cited in the file of this patent

UNITED STATES PATENTS

| 2,178,969 | Ruben | Nov. 7, 1939 |
| 2,542,710 | Ruben | Feb. 20, 1951 |
| 2,631,115 | Fox | Mar. 10, 1953 |

FOREIGN PATENTS

| 414,286 | Great Britain | Aug. 2, 1934 |

OTHER REFERENCES

Primary Batteries, Vinal, pp. 321–323, 1950 edition.
Moeller, T.: "Inorganic Chemistry," John Wiley and Sons, New York, 1952, pages 286–289.